US012254135B2

(12) United States Patent
Rajanna et al.

(10) Patent No.: US 12,254,135 B2
(45) Date of Patent: Mar. 18, 2025

(54) SIMULATION OF A PHYSICAL INTERFACE UTILIZING TOUCH TRACKING, FORCE SENSING, AND HAPTIC FEEDBACK

(71) Applicant: Sensel, Inc., Sunnyvale, CA (US)

(72) Inventors: Vijay Rajanna, San Jose, CA (US); Darren Lochun, Mountain View, CA (US); Ilya Daniel Rosenberg, Mountain View, CA (US); Tomer Moscovich, San Francisco, CA (US)

(73) Assignee: Sensel, Inc., Sunnyvale, CA (US)

( * ) Notice: Subject to any disclaimer, the term of this patent is extended or adjusted under 35 U.S.C. 154(b) by 0 days.

(21) Appl. No.: 18/191,833

(22) Filed: Mar. 28, 2023

(65) Prior Publication Data

US 2024/0329740 A1    Oct. 3, 2024

(51) Int. Cl.
  *G06F 3/01*       (2006.01)
  *G06F 3/0354*    (2013.01)

(52) U.S. Cl.
  CPC .......... *G06F 3/016* (2013.01); *G06F 3/03547* (2013.01)

(58) Field of Classification Search
  CPC ....... G06F 3/016; G06F 3/03547; G06F 3/044
  See application file for complete search history.

(56) References Cited

U.S. PATENT DOCUMENTS

| | | | |
|---|---|---|---|
| 8,717,151 B2 | 5/2014 | Forutanpour et al. | |
| 9,152,288 B2 | 10/2015 | Dietz | |
| 9,317,118 B2 * | 4/2016 | Puskarich | G06F 3/016 |
| 9,729,730 B2 * | 8/2017 | Levesque | H04M 19/04 |
| 9,965,049 B2 * | 5/2018 | Kim | G06F 3/038 |
| 10,275,087 B1 | 4/2019 | Smith | |
| 10,747,322 B2 | 8/2020 | Cruz-Hernandez et al. | |
| 11,275,405 B2 | 3/2022 | Hotelling | |
| 2008/0024459 A1 * | 1/2008 | Poupyrev | G06F 3/0488 345/173 |
| 2009/0322498 A1 * | 12/2009 | Yun | G06F 3/0488 345/173 |
| 2010/0053087 A1 * | 3/2010 | Dai | H03K 17/9622 178/18.06 |
| 2010/0156818 A1 | 6/2010 | Burrough et al. | |

(Continued)

OTHER PUBLICATIONS

"Graphical widget" Wikipedia. [https://en.wikipedia.org/wiki/Graphical_widget] retrieved Jan. 26, 2023, 6 pages.

(Continued)

*Primary Examiner* — Kenneth Bukowski

(57) ABSTRACT

Simulation of a physical interface utilizing touch tracking, force sensing, and haptic feedback is presented herein. A system tracks, via a touch sensing device of a tactile sensor of the system, a movement of a finger across the tactile sensor; in response to a location of the movement being determined to correspond to an interactive surface of the tactile sensor, the system generates, at the location, a first haptic feedback representing a defined type of simulated physical interface; based on the defined type of simulated physical interface, the system detects a force that has been applied to the tactile sensor; and in response to the force being determined to satisfy a defined force condition representing that an action is to be initiated, the system generates, via the interactive surface, a second haptic feedback representing that the action has been initiated by the system.

20 Claims, 13 Drawing Sheets

(56) References Cited

U.S. PATENT DOCUMENTS

| | | | |
|---|---|---|---|
| 2010/0231550 A1* | 9/2010 | Cruz-Hernandez | G06F 3/016 345/174 |
| 2011/0285637 A1* | 11/2011 | Karkkainen | G06F 3/016 345/173 |
| 2013/0088438 A1* | 4/2013 | Shih | G06F 3/016 345/173 |
| 2014/0098038 A1* | 4/2014 | Paek | G06F 3/04886 345/173 |
| 2014/0176455 A1* | 6/2014 | Araki | G06F 3/0488 345/173 |
| 2015/0067497 A1* | 3/2015 | Cieplinski | G06F 3/0488 715/702 |
| 2015/0293592 A1* | 10/2015 | Cheong | G06F 1/163 345/173 |
| 2016/0246375 A1* | 8/2016 | Rihn | G06F 3/0483 |
| 2017/0083096 A1* | 3/2017 | Rihn | G06F 3/04883 |
| 2017/0160805 A1* | 6/2017 | Du | G06F 1/3231 |
| 2018/0074694 A1 | 3/2018 | Lehmann et al. | |
| 2018/0246572 A1* | 8/2018 | Yang | G06F 1/1643 |
| 2020/0293113 A1* | 9/2020 | Chaudhri | G06F 3/04845 |
| 2021/0089182 A1 | 3/2021 | Sheng et al. | |
| 2021/0232237 A1* | 7/2021 | Alfano | G06F 3/0346 |
| 2021/0398402 A1 | 12/2021 | Richards et al. | |
| 2022/0171463 A1* | 6/2022 | Chen | G06F 3/016 |
| 2022/0391016 A1 | 12/2022 | Cody et al. | |

OTHER PUBLICATIONS

International Search Report for PCT Application No. PCT/US2024/021383 dated Jun. 17, 2024, 15 pages.

* cited by examiner

Generate continuous haptic feedback when user finger determined to be moving within the interactive surface

SIMULATION OF A PHYSICAL INTERFACE UTILIZING TOUCH TRACKING, FORCE SENSING, AND HAPTIC FEEDBACK

TECHNICAL FIELD

The subject disclosure generally relates to embodiments for simulation of a physical interface utilizing touch tracking, force sensing, and haptic feedback.

BACKGROUND

Consumer electronic devices are increasingly adopting minimalistic and/or seamless user interfaces. For example, conventional electronic devices have removed physical interfaces such as buttons, edges, indents, textures, and other types of protrusions and/or depressions in favor of maintaining a smooth surface as a user interface.

Although maintaining minimalistic designs can be cost effective and improve aesthetics, removing a physical interface deprives users from tactile and kinesthetic feedback that are key components of a user experience-negatively impacting user engagement, and leading to user interaction breakdown(s) such as an inability to locate user control(s) and/or to differentiate between the control(s). In this regard, conventional device technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
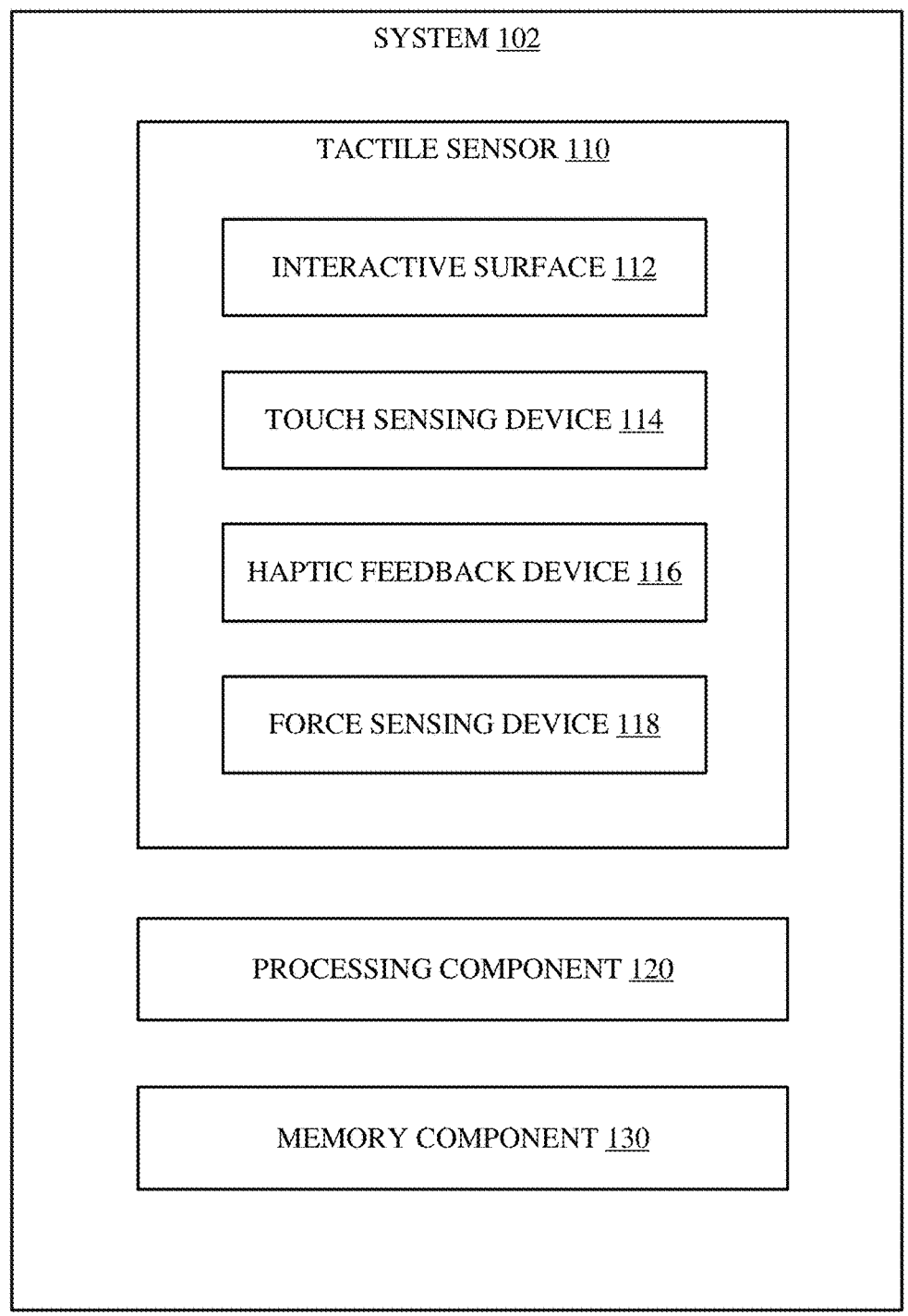
FIG. 1 illustrates a block diagram of a system including a tactile sensor that simulates a physical interface utilizing touch tracking, force sensing, and haptic feedback, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, consumer electronic devices have had some drawbacks with respect to adopting minimalistic and/or seamless user interfaces, which negatively impact user engagement and lead to user interaction breakdown(s), e.g., including an inability to locate user control(s) and/or to differentiate between such control(s) when using such interfaces. On the other hand, various embodiments disclosed herein can improve user experiences corresponding to use of minimalistic, e.g., smooth, physical design interfaces by generating, e.g., via haptic widget(s) (e.g., haptic-based graphical widget(s) of a graphical user interface (GUI) that have been implemented via a surface of a touch sensing device; haptic-based graphical control element(s) of the GUI that have been implement via the surface of the touch sensing device), virtual/simulated physical controls utilizing a combination of touch tracking, force sensing, and haptic feedback.

For example, a system (e.g., computing device, vehicle control system, tablet, tablet computer, personal digital assistant (PDA), laptop computer, appliance, wireless communication device, wireless appliance, or other computing devices including a touch sensing device) comprises a processor; and a memory that stores executable instructions that, when executed by the processor, facilitate performance of operations by the processor, comprising: tracking, via a touch sensing device of a tactile sensor, a movement of a finger across the tactile sensor; in response to a location of the movement being determined to correspond to an interactive surface of the tactile sensor that represents a defined type of simulated physical interface, generating, via a haptic feedback device of the tactile sensor that is physically coupled to the interactive surface, a first haptic feedback at the location—the first haptic feedback representing a first indication of the defined type of simulated physical interface. In an embodiment, the first haptic feedback is continuously generated in response to a finger being determined to be moving within the interactive surface.

The operations further comprise: based on the defined type of simulated physical interface, detecting, via a force sensing device of the tactile sensor, whether a force that has been applied, by the finger, to the interactive surface satisfies a defined force condition representing that an action is to be initiated, via the defined type of simulated physical interface, by the system; and in response to the force being determined to satisfy the defined force condition representing that the action is to be initiated, generating, via the haptic feedback device, a second haptic feedback via the interactive surface—the second haptic feedback representing a second indication that the action has been initiated by the system via the defined type of simulated physical interface.

In an embodiment, the operations further comprise: in response to the force being determined to satisfy a defined force duration condition representing that the force has been applied to the interactive surface for a defined period, e.g., representing that the finger has been applying the force in accordance with the defined force condition for the defined period, repeatedly triggering the action, e.g., the action representing a scrolling event or a scrolling input.

In an embodiment, the defined type of simulated physical interface comprises a simulated push-button or toggle-switch interface. In one embodiment, the first haptic feedback simulates a structured texture representing an array of physical dots representing the simulated push-button or toggle-switch interface. In another embodiment, the second haptic feedback represents that the simulated push-button or toggle-switch interface has been switched on/off or toggled.

In yet another embodiment, the action is a first action, and the operations further comprise: in response to detecting, via the force sensing device, that two fingers have been pressed down onto the simulated push-button or toggle-switch interface, the system initiates a second action that is different from the first action.

In an embodiment, the defined type of simulated physical interface comprises a simulated slider interface. In one embodiment, the first haptic feedback simulates a randomized texture representing a wooden pattern representing the simulated slider interface.

In another embodiment, the movement is a first movement, the second haptic feedback represents that the simulated slider interface has been activated, and the operations further comprise: in response to the force being determined to satisfy the defined force condition, and further in response to a second movement of the finger across the tactile sensor being determined to satisfy a defined movement condition representing that the finger has moved across the tactile sensor in a defined direction for a defined distance, generating, via the haptic feedback device, a third haptic feedback via the interactive surface—the third haptic feedback representing that the simulated slider interface has moved across the tactile sensor in the defined direction for the defined distance, in which the defined movement condition corresponds to an incremental modification of a variable corresponding to a device of the system.

In an embodiment, the action is a first action, and the operations further comprise: in response to detecting, via the force sensing device, that two fingers have been pressed down onto the simulated slider interface, initiating a second action that is different from the first action.

In one embodiment, the first haptic feedback comprises a haptic waveform, and the operations further comprise: determining a speed of the movement; and based on the speed of the movement, modifying a type of the haptic waveform, an amplitude of the haptic waveform, and/or a frequency of the haptic waveform.

In another embodiment, the first haptic feedback comprises a haptic waveform, the force is a first applied force, and the operations further comprise: determining, via the force sensing device, a second applied force corresponding to the movement of the finger across the tactile sensor; and based on the second applied force, modifying a type of the haptic waveform, an amplitude of the haptic waveform, and/or a frequency of the haptic waveform.

In yet another embodiment, the location is a first location, and the operations further comprise: generating a third haptic feedback to facilitate identification of a second location of the interactive surface, in which the third haptic feedback represents a third indication of a boundary of the interactive surface and simulates an edge of the boundary and/or a contour of the boundary.

In an embodiment, the system further comprises a touchpad-based user interface comprising the tactile sensor and respective regions comprising respective interaction zones comprising respective haptic widgets—the respective haptic widgets representing respective simulated physical interfaces comprising the defined type of simulated physical interface.

In one embodiment, a method comprises: in response to a movement of a finger across a touch sensor being determined to correspond to a defined type of simulated physical interface of the touch sensor, generating, by a system comprising a processor, first haptic feedback representing the defined type of simulated physical interface; in response to detecting a force that has been applied to the touch sensor, determining, by the system, whether the force satisfies a defined force condition representing that an action is to be initiated via the defined type of simulated physical interface; and in response to the force being determined to satisfy the defined force condition, generating, by the system, a second haptic feedback representing that the action has been initiated via the defined type of simulated physical interface, and performing, by the system, the action.

In an embodiment, the method further comprises: in response to the force being determined to satisfy a defined force duration condition representing that the force has been applied to the touch sensor for a defined period, e.g., representing that the finger has been applying the force in accordance with the defined force condition for the defined period, repeatedly triggering, by the system, the action, e.g., the action representing a scrolling event or input.

In another embodiment, the generating of the second haptic feedback comprises: in response to the movement of the finger being determined to correspond to a haptic widget representing a virtual push-down button, and in response to the force being determined to satisfy a defined force condition representing that the virtual push-down button has been pushed, generating the second haptic feedback representing that the virtual push-down button has been pushed.

In yet another embodiment, the movement is a first movement, and the generating of the second haptic feedback comprises: in response to the first movement of the finger being determined to correspond to a haptic widget representing a virtual slider control, and further in response to the force being determined to satisfy the defined force condition representing that the virtual slider control has been contacted, and further in response to a second movement of the finger being determined to satisfy a defined movement condition representing that the finger has moved across the touch sensor in a defined direction for a defined distance, generating a third haptic feedback representing that the virtual slider control has moved in the defined direction for the defined distance, in which the defined movement condition corresponds to an incremental modification of a variable corresponding to an application of a device of the system.

In an embodiment, the method further comprises: generating, by the system, a third haptic feedback that represents a boundary of the touch sensor by simulating an edge of the boundary and/or a contour of the boundary.

In one embodiment, the method further comprises: determining, by the system, a speed of the movement or an applied force corresponding to the movement; and based on the speed of the movement or the applied force corresponding to the movement, modifying, by the system, a type of a haptic waveform of the first haptic feedback, an amplitude of the haptic waveform, and/or a frequency of the haptic waveform.

In another embodiment, a non-transitory machine-readable medium comprises executable instructions that, when executed by a system comprising a processor, facilitate performance of operations, comprising: in response to a location of a surface of a tactile sensor being determined to have been contacted, determining whether the location corresponds to a defined type of simulated physical interface; in response to the location being determined to correspond to the defined type of simulated physical interface, generating, via the surface, first haptic feedback representing an indication of the defined type of simulated physical interface; and in response to a force that has been applied to the surface of the tactile sensor being determined to satisfy a defined force condition representing that an action is to be initiated, generating, via the surface, a second haptic feedback representing that the action has been initiated via the defined type of simulated physical interface, and performing the action.

In yet another embodiment, the generating of the first haptic feedback comprises: simulating a structured texture representing an array of physical dots representing a simulated push-button interface or a simulated toggle-switch interface, or simulating a randomized texture representing a wooden pattern representing a simulated slider interface. In an embodiment, the first haptic feedback is continuously generated in response to a finger being determined to be moving within the simulated push-button, simulated toggle-switch, and/or simulated slider interface.

As described above, conventional electronic devices favor maintaining smooth user interfaces by removing physical interfaces such as buttons, edges, indents, textures, and other types of protrusions and/or depressions, e.g., to reduce device costs and/or improve aesthetics; however, removing such physical interfaces deprive users from tactile and kinesthetic feedback that are key components of a user experience. On the other hand, various embodiments disclosed herein can improve user experience(s) by combining touch tracking, force sensing, and haptic feedback to simulate, via a tactile sensor, physical shape, texture, and functionality of different types of physical controls via minimalistic and/or seamless user interfaces.

In this regard, and now referring to FIG. 1, a block diagram (100) of a system (102) (e.g., computing device, vehicle control system, tablet, tablet computer, PDA, laptop computer, appliance, wireless communication device, wireless appliance, or other type of computing device) including a tactile sensor (110) that simulates a physical interface utilizing touch tracking, force sensing, and haptic feedback is illustrated, in accordance with various example embodiments.

The system includes the tactile sensor, a processing component (120), and a memory component (130). The tactile sensor includes an interactive surface (112), a touch sensing device (114), a haptic feedback device (116), and a force sensing device (118). In embodiment(s) the processing component can include processor(s) or similar computing device(s) that can perform operations and/or execute machine executable instructions that can be read from the memory component that can include non-volatile memory, volatile memory, a non-transitory computer-readable medium, and/or other data storage and/or memory device(s). In this regard, the system can perform, via the processing component and the memory component, operations disclosed herein via the touch sensing device.

In embodiment(s), the touch sensing device can include capacitive-based sensors (not shown), an array of capacitive-based sensors (not shown), optical-based sensors (not shown), an array of optical-based sensors (not shown), or other types of touch-based sensors or devices electronically and/or physically coupled to the interactive surface to facilitate sensing contact and/or movement of a finger within, e.g., a defined area of, the interactive surface.

In other embodiment(s), the force sensing device can include force-based sensors (not shown) that can be embedded within, above, below, etc. the touch-based sensors/devices of the touch sensing device to facilitate sensing force(s) that have been applied by the finger to the interactive surface.

In yet other embodiment(s), the haptic feedback device can include vibration generating device(s) (not shown), waveform generator(s), or other vibration and/or waveform generation devices (e.g., embedded within, above, below, etc. sensors of the touch sensing device)—the haptic feedback device being physically coupled to the interactive surface of the tactile sensor to simulate, e.g., via defined waveforms(s), a defined type of simulated physical interface, e.g., a push-button interface, a slider control interface.

In embodiment(s), the haptic feedback device simulates the defined type of simulated physical interface using a haptic widget, e.g., a haptic-based graphical widget of a graphical user interface (GUI) that has been implemented via the interactive surface of the touch sensing device; a haptic-based graphical control element of the GUI that has been implemented via the surface of the touch sensing device. In this regard, in various embodiment(s), the haptic feedback device utilizes the vibration generating devices to generate vibration(s) via the haptic widget.

In embodiment(s), the touch sensing device tracks a movement of a finger across the tactile sensor. Further, in response to a location of the movement being determined, by the system, to correspond to the interactive surface, e.g., corresponding to and/or representing the defined type of simulated physical interface, the haptic feedback component generates a first haptic feedback at the location—the first haptic feedback representing a first indication of the defined type of simulated physical interface. In an embodiment, the haptic feedback component continuously generates the first haptic feedback in response to the location of the movement being determined, by the system, to be moving within the interactive surface.

Figure 2:
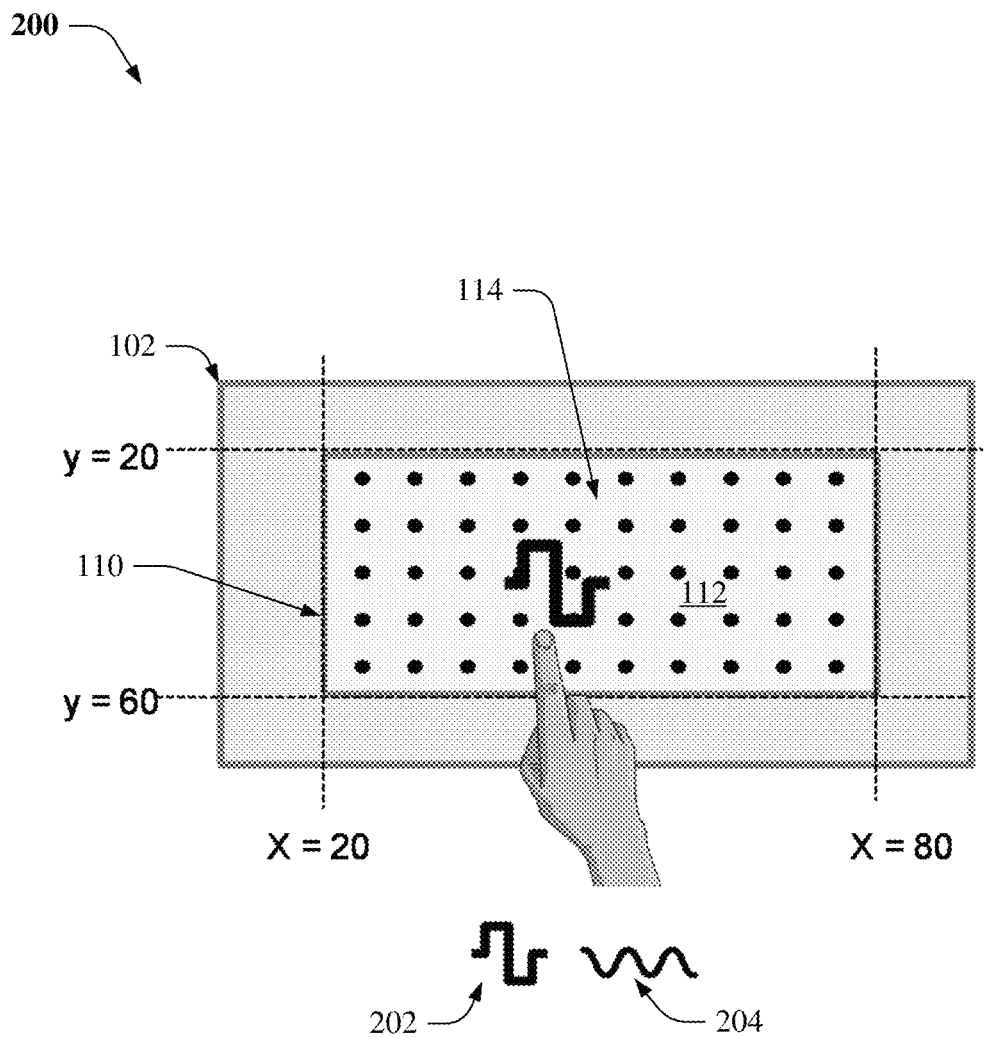
FIG. 2 illustrates a block diagram of haptic feedback simulating a structured texture representing a simulated push-button interface, in accordance with various example embodiments.
Figure 3:
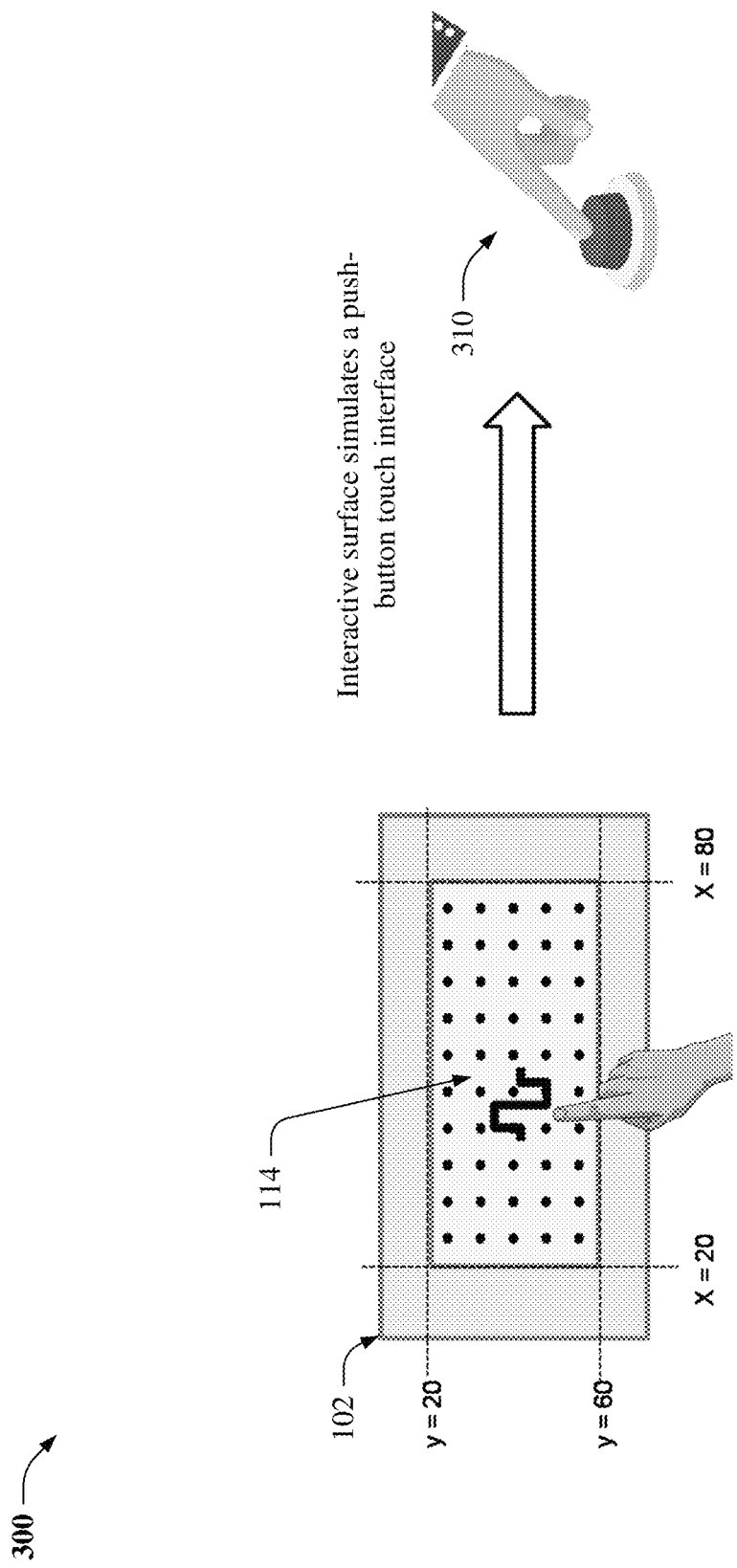
FIG. 3 illustrates a block diagram of a simulated push-button interface in which haptic feedback has been generated to represent that the simulated push-button interface has been pushed, in accordance with various example embodiments.

In this regard, and now referring to embodiment(s) illustrated by FIGS. 2 and 3, in response to the interactive surface being determined to be assigned, e.g., via the system, to a simulated push-button interface (310), the haptic feedback device generates the first haptic feedback, e.g., comprising a sine waveform, a square waveform, or other type of structured waveform (e.g., 202, 204), to simulate, e.g., via a haptic widget, a structured texture within the interactive surface that represents the simulated push-button interface. In embodiment(s), the first haptic feedback simulates, via the haptic widget, the structured texture as an array of physical dots representing the simulated push-button interface. In embodiment(s), the haptic feedback device continuously generates the first haptic feedback in response to the location of the movement of the finger being determined to be within the simulated push-button interface.

In turn, the force sensing device detects a force that has been applied, by the finger, to the simulated push-button interface. Further, in response to the force being determined to satisfy a defined force condition representing that the simulated push-button interface has been pushed, e.g., pressed down within a predefined force range of 300 grams to 900 grams, the system generates, using the haptic feedback device via the haptic widget, a second haptic feedback via the interactive surface—the second haptic feedback representing that the simulated push-button interface has been pressed down.

Although various embodiments described herein generate, via the haptic feedback device, haptic feedback in response to force(s) that have been determined, e.g., via the force sensing device, to have been applied to respective simulated physical interfaces, in other embodiments (not shown), haptic feedback can be generated, via the haptic feedback device, in response to detection, via the touch sensing device, of contact and/or movement of the finger utilizing capacitive-based sensors, an array of capacitive-based sensors, optical-based sensors, an array of optical-based sensors, or other types of touch-based sensors or devices electronically and/or physically coupled to the interactive surface to facilitate sensing the contact and/or movement of the finger within and/or upon the interactive surface.

For example, in an embodiment, a haptic event can be triggered via time-based contact of the capacitive-based sensors, optical-based sensors, or other types of touch-based sensors, e.g., triggered in response to a determination that the time-based contact satisfied a defined condition representing that the contact has occurred for at least a defined period.

In other embodiment(s), detection of respective contacts of the interactive surface within different predefined force ranges can trigger the system to perform different haptic events and/or corresponding actions. In yet other embodiment(s), the detection of the respective contacts within the different predefined force ranges, combined with respective detected durations of such contacts of the interactive surface, can trigger the system to perform different haptic events and/or corresponding actions.

For example, in response to the force being determined to satisfy a first force range condition representing that the simulated push-button interface has been pushed/pressed down within a first force range, the system generates, via the haptic feedback device, a first type of haptic feedback and performs a first action, e.g., restarts, resets, and/or reboots the system. In another example, in response to the force being determined to satisfy a second force range condition representing that the simulated push-button interface has been pushed/pressed down within a second force range different than the first force range, the system generates, via the haptic feedback device, a second type of haptic feedback (different than the first haptic feedback, and performs a second action that is different from the first action, e.g., adjusts a brightness of a display of the system, adjusts a volume of a sound device of the system.

In an embodiment, in response to determining that the simulated push-button interface has been pressed down within the predefined force range (e.g., a force ranging between 300 grams to 900 grams), the system modifies a binary variable, e.g., from 1/0 to 0/1, e.g., turning a device (e.g., a lighting device, an audio device, a multimedia device, or other device (e.g., of a vehicle)) on/off, or modifying a function and/or parameter of an application corresponding to the device, e.g., corresponding to an application associated with an interior of the vehicle; corresponding to an audio application of an audio device, e.g., play/pause music being played via the audio device, incrementally increment/decrement the parameter, e.g., corresponding to a volume control, a fader control, a balance control, a bass control, a treble control, a heat level control, an air conditioning (AC) control (e.g., temperature, humidity, fan speed); e.g., via successive detections of the simulated push-button interface being pressed down at the predefined force range (e.g., a force ranging between 300 grams to 900 grams).

In one embodiment, in response to the force being determined to satisfy another defined force condition representing that the simulated push-button interface has been pressed down within another predefined force range (e.g., a force ranging between 900 grams to 1500 grams), the system generates, via the haptic feedback device, the second haptic feedback via the interactive surface; and further modifies the parameter of the device to a maximum value, e.g., modifying an intensity of the lighting device to a maximum brightness, modifying a volume of the audio device to a maximum volume.

Figure 4:
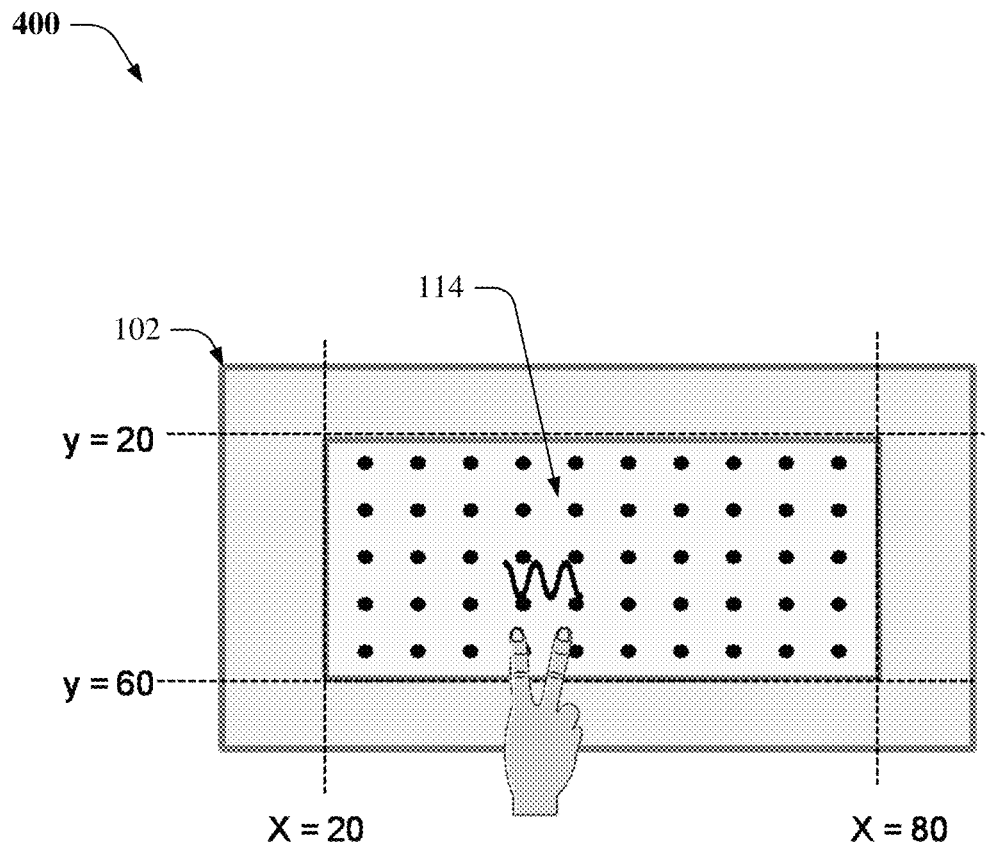
FIG. 4 illustrates a block diagram of a simulated push-button interface of a system being contacted by two fingers to initiate an action to be performed by the system, in accordance with various example embodiments.

Referring now to FIG. 4, a block diagram (400) of the simulated push-button interface being contacted by two fingers to initiate an action to be performed by the system is illustrated, in accordance with various example embodiments. In this regard, in response to detecting, via the force sensing device, or via another touch-based sensor or device, that two fingers have been pressed down onto the simulated push-button interface, the system initiates a second action that is different from the first action, e.g., forwarding/skipping forward to a "next" track/music piece of an album/music source; skipping forward to a next radio station of a receiver.

In other embodiment(s), in response to detecting, via the force sensing device, or via another touch-based sensor or device, that three fingers have been pressed down onto the simulated push-button interface, the system initiates a third action that is different from the second action, e.g., rewinding/skipping backward to a "previous" track/music piece of the album/music source; skipping backward to a previous radio station of the receiver.

In another embodiment, in response to detecting, via the force sensing device, or via another touch-based sensor or device, that four fingers have been pressed down onto the simulated push-button interface, the system initiates a fourth action that is different from third action, e.g., selecting a different application and corresponding functions to be performed via the different application, selecting a different device from which the different application and corresponding functions are to be performed.

Figure 5:
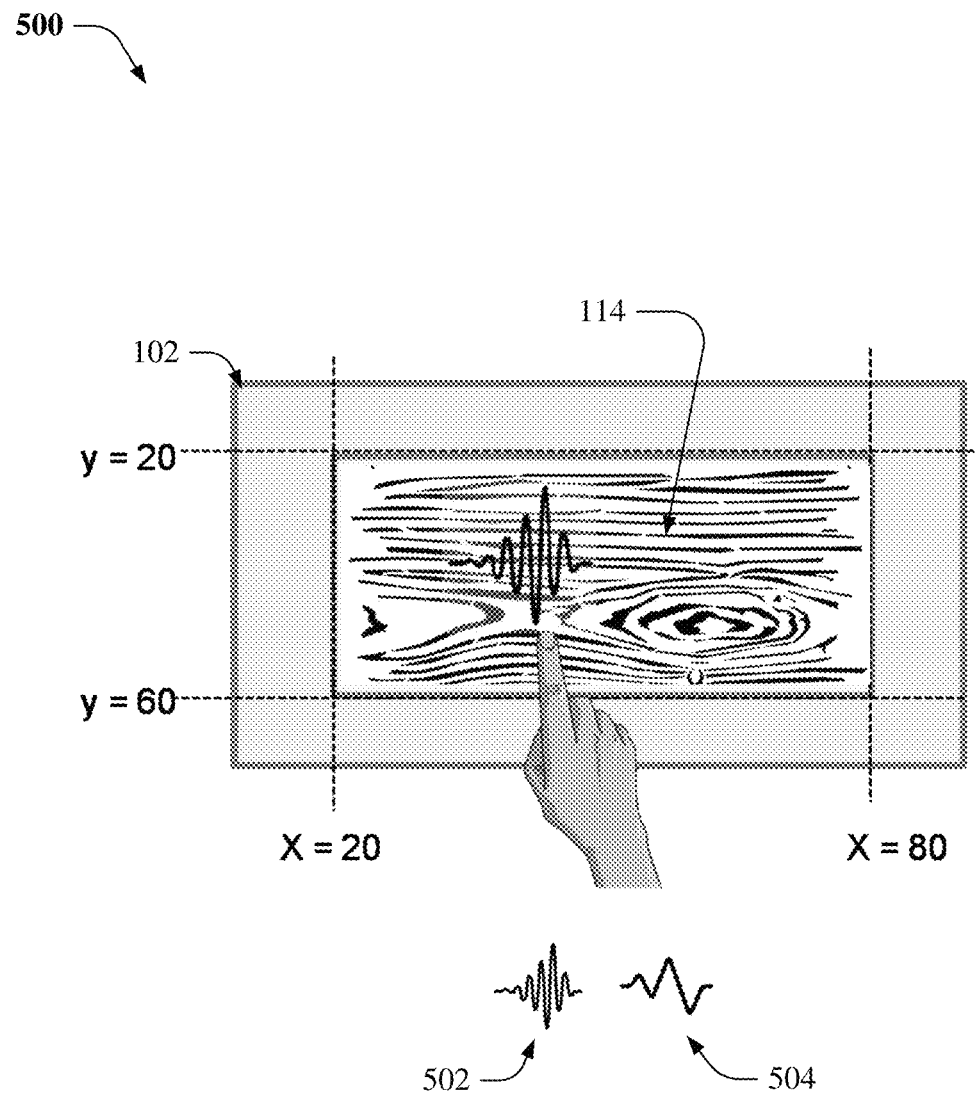
FIG. 5 illustrates a block diagram of haptic feedback simulating a randomized texture representing a simulated slider interface, in accordance with various example embodiments.
Figure 6:
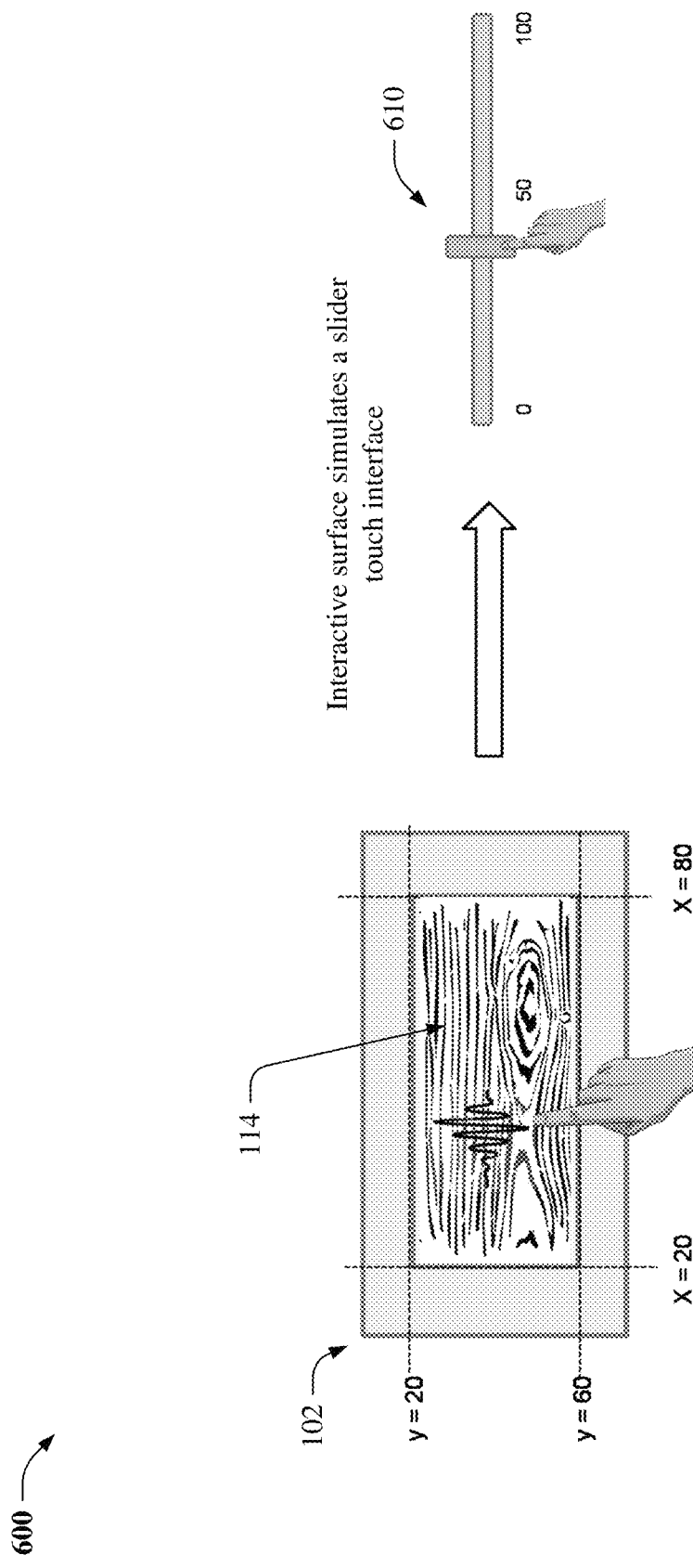
FIG. 6 illustrates a block diagram of a simulated slider interface in which haptic feedback has been generated representing that the simulated slider interface has moved across the tactile sensor in a defined direction for a defined distance, in accordance with various example embodiments.

Referring now to embodiment(s) illustrated by FIGS. 5 and 6, in response to the interactive surface being determined to be assigned, e.g., via the system, to a simulated slider interface (610), the haptic feedback device generates the first haptic feedback, e.g., comprising a sine waveform, a square waveform, or other type of structured waveform (e.g., 502, 504), to simulate, (e.g., via a haptic widget) a randomized texture within the interactive surface representing the simulated slider interface. In embodiment(s), the first haptic feedback simulates, via the haptic widget, the structured texture as a wooden pattern representing the simulated slider interface.

In turn, the force sensing device detects a force that has been applied, by the finger, to the simulated slider interface. Further, in response to the force being determined to satisfy a defined force condition representing that the simulated slider interface has been activated, e.g., pressed down at a force greater than 200 grams, pressed down within a predefined range of forces, the touch sensing device further determines whether the finger has moved across the tactile sensor in a defined direction for a defined distance.

In this regard, in embodiment(s), for each defined distance (e.g., millimeter) that the finger has been determined, by the touch sensing device, to have moved in the defined direction (e.g., to the left/right) while the simulated slider interface has been activated, the system increases/decreases a parameter/variable (e.g., by a defined number of units (e.g., 1, 5)) of an application corresponding to the device, e.g., corresponding to the interior of a vehicle; e.g., the application incrementally incrementing/decrementing the parameter, e.g., corresponding to a volume control, a fader control, a balance control, a bass control, a treble control, a heat level control, an air conditioning (AC) control (e.g., temperature, humidity, fan speed).

Further, for each defined distance that the finger has been determined to have moved, the haptic feedback component generates, using the haptic feedback device via the haptic widget, a haptic feedback via the interactive surface—the haptic feedback representing that the simulated slider interface has moved across the tactile sensor in the defined direction for the defined distance.

Figure 7:
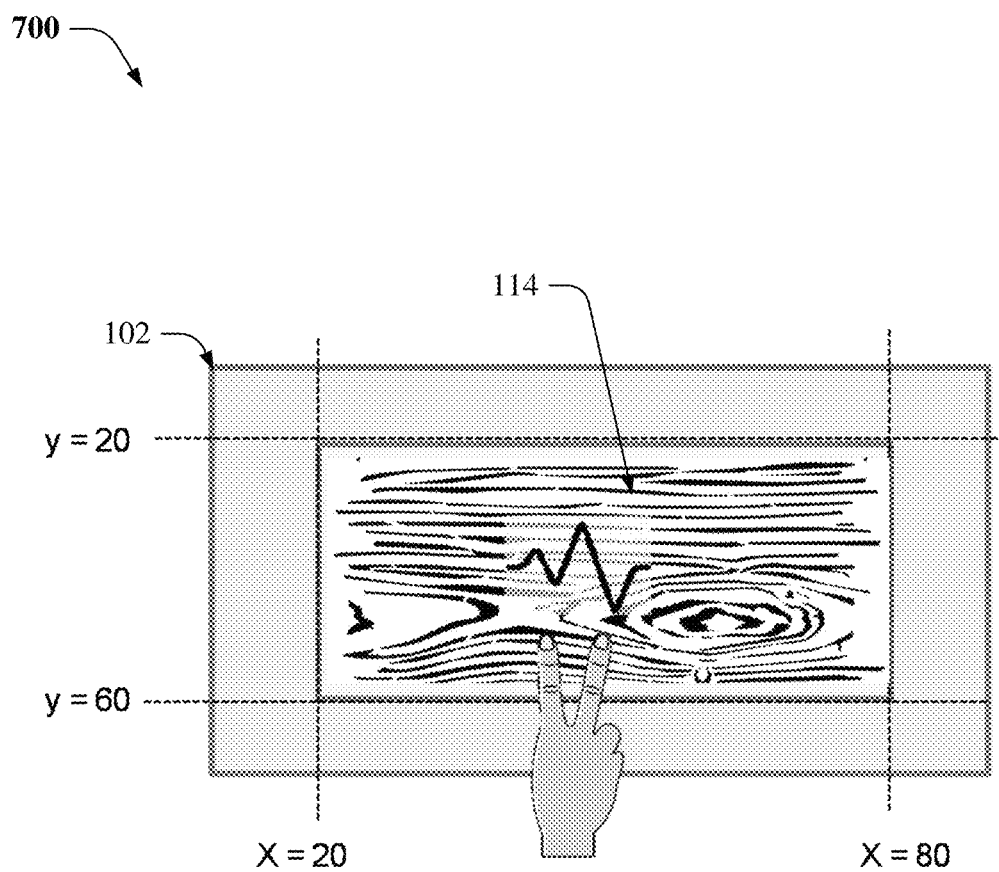
FIG. 7 illustrates a block diagram of a simulated slider interface of a tactile sensor of a system—the simulated slider interface being contacted by two fingers to initiate an action to be performed by the system, in accordance with various example embodiments.

Referring now to FIG. 7, a block diagram (700) of the simulated slider interface being contacted by two fingers to initiate an action to be performed by the system is illustrated, in accordance with various example embodiments. In this regard, in response to detecting, via the force sensing device, that more than one point and/or area of the simulated slider interface have been pressed down, e.g., by at least two fingers, the system (102) initiates a second action that is different from the first action, e.g., the first action adjusting a volume of a device, and the second action adjusting a brightness of a display device.

In embodiment(s) described herein with respect to detection of a simulated physical interface being contacted by two or more fingers, such contacts can occur from the same hand of a user, both hands of the user, or from hands of different users, e.g., a driver of a vehicle and a passenger of the vehicle.

In this regard, in other embodiment(s), the system can differentiate, via sensing devices described herein, between respective contacts of the interactive surface being made by different users, e.g., using location-based sensing devices, e.g., capacitive-based sensing devices, and/or optical-based sensing devices located in different parts of a vehicle. For example, the system can enable a driver of a vehicle to perform, via the interactive surface, a restricted and/or limited set of input operations than another set of input operations that a passenger can be enabled to perform via the interactive surface, e.g., for safety reasons.

Figure 8:
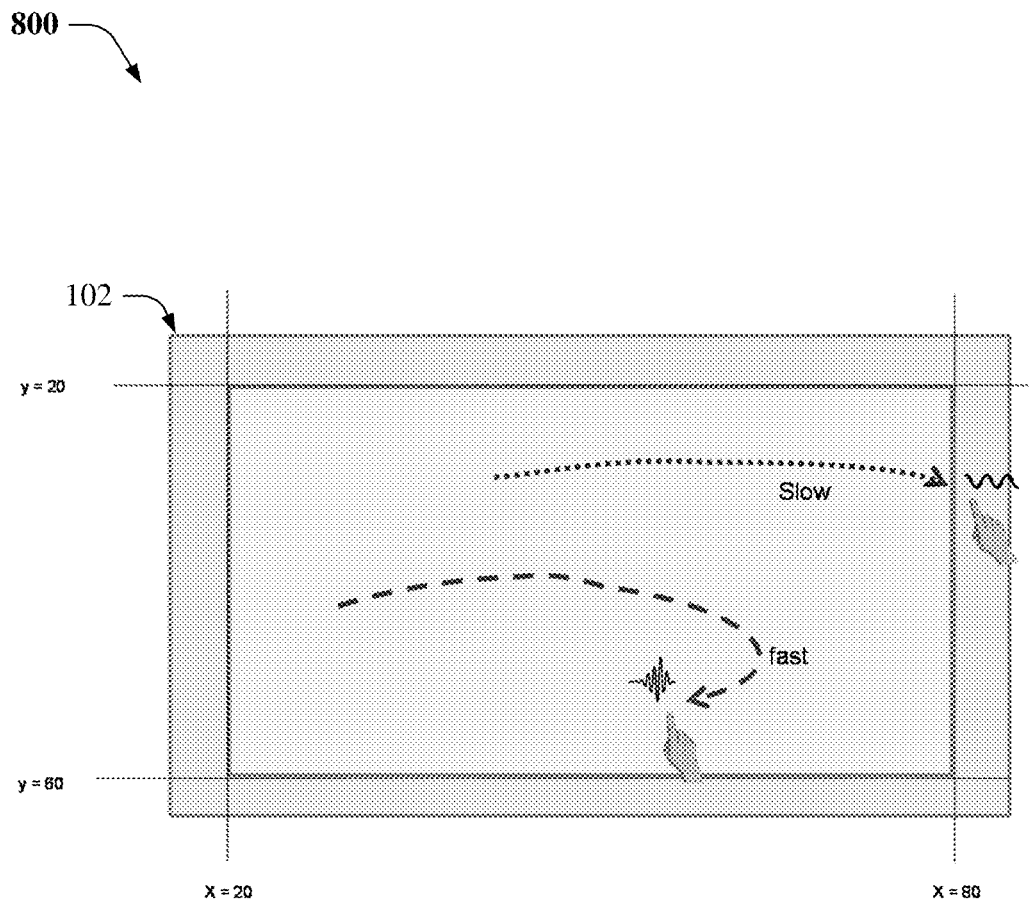
FIG. 8 illustrates a block diagram of a simulated physical interface of an interactive surface of a tactile sensor of a system, in which a type of haptic waveform of haptic feedback that is to be applied to the interactive surface, an amplitude of the haptic waveform, and/or a frequency of the haptic waveform is modified based on a speed of a movement of a finger across the interactive surface, in accordance with various example embodiments.

FIG. 8 illustrates a block diagram (800) of a simulated physical interface of an interactive surface of a tactile sensor (110) of a system (102), in which a type of haptic waveform of haptic feedback that is to be applied to the interactive surface, an amplitude of the haptic waveform, and/or a frequency of the haptic waveform is modified based on a determined speed of a movement of a finger across the interactive surface, in accordance with various example embodiments to create intuitive and rich user experience.

Figure 9:
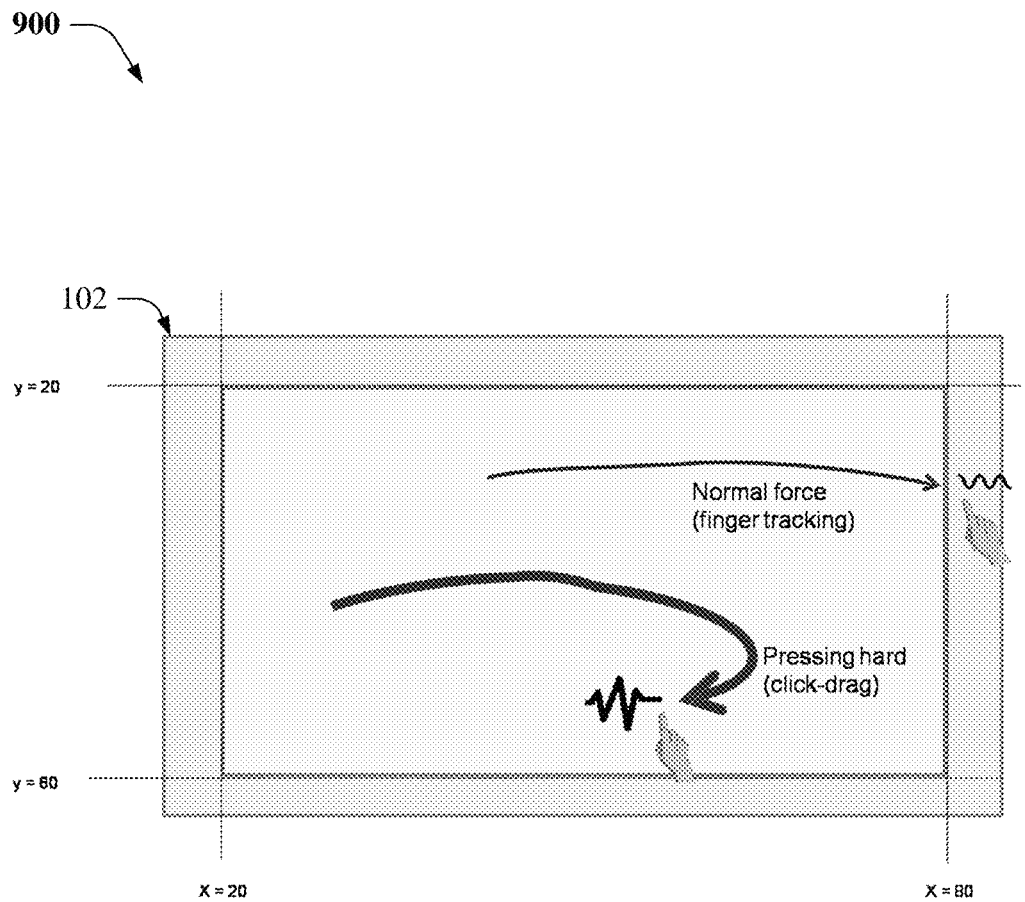
FIG. 9 illustrates a block diagram of a simulated physical interface of an interactive surface of a tactile sensor of a system, in which a type of haptic waveform of haptic feedback that is to be applied to the interactive surface, an amplitude of the haptic waveform, and/or a frequency of the haptic waveform is modified based on a force that has been applied to the interactive surface, in accordance with various example embodiments.

FIG. 9 illustrates a block diagram (900) of a simulated physical interface of an interactive surface of a tactile sensor (110) of a system (102), in which a type of haptic waveform of haptic feedback that is to be applied to the interactive surface, an amplitude of the haptic waveform, and/or a frequency of the haptic waveform is modified based on a force that has been applied to the interactive surface, in accordance with various example embodiments to create intuitive and rich user experience. In an embodiment, in response to the force sensing device determining that the force satisfies a defined force condition representing that a location of the finger is to be tracked, the touch sensing device tracks a movement of the finger across the tactile sensor.

In another embodiment, in response to the force sensing device determining that the force satisfies a defined force condition representing that a click-drag function is to be performed based on a movement of the finger across the tactile sensor, the touch sensing device performs operations described herein with respect to use of the simulated slider interface, e.g., in which an activation of the simulated slider interface is represented, e.g., via a haptic feedback, as a "click", and in which movement of the simulated slider interface corresponds to the finger being determined to be "dragged" across tactile sensor.

In various embodiment(s), one or more components and/or aspects of the system (102) are configurable, e.g., via an application executing on the system. For example, a user can specify, via the application using a user interface (not shown) of the system, respective types of haptic patterns, e.g., structured pattern (e.g., representing physical dots and/or bumps), randomized pattern (e.g., representing a wooden pattern), to be associated with the interactive surface. Further, the user can select, via the application using the user interface, respective types of simulated physical interfaces (e.g., push button, slider, toggle switch, other physical interface) to be associated with the respective types of haptic patterns.

In other embodiment(s), the user can specify, via the application using the user interface, one or more of the following: a defined number of contact points of the interactive surface to be determined to be contacted, e.g., by 1, 2, 3, or more fingers, before triggering and/or initiating performance of a defined action; defined respective ranges of forces to be determined to be applied to the interactive service before triggering and/or initiating respective actions, e.g., specifying that detection of a finger contacting (pushing down on) a simulated push-button interface within a force range of 300 grams to 900 grams initiates activation of a light, and pushing further down from 900 to 1500 grams sets the light to maximum brightness.

Figure 10:
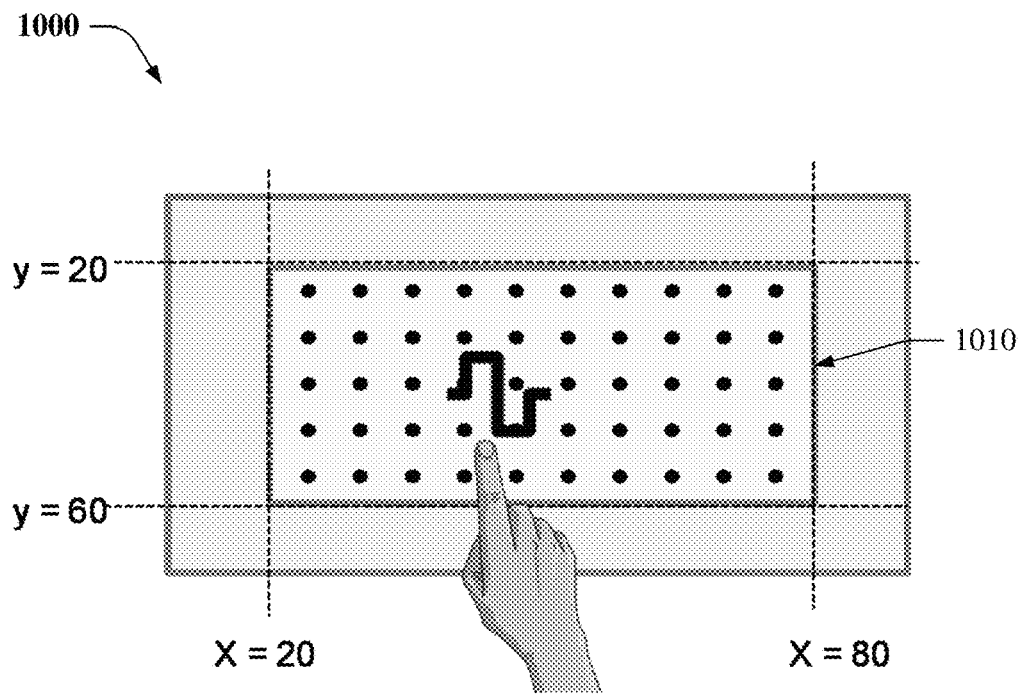
FIG. 10 illustrates a block diagram of simulated physical interfaces of respective interactive surfaces including tactile sensors, in which the respective interactive surfaces generate continuous haptic feedback-simulating a structured texture or a randomized texture—in response to a finger being determined to be moving within the interactive surfaces, in accordance with various example embodiments.
Figure 10:
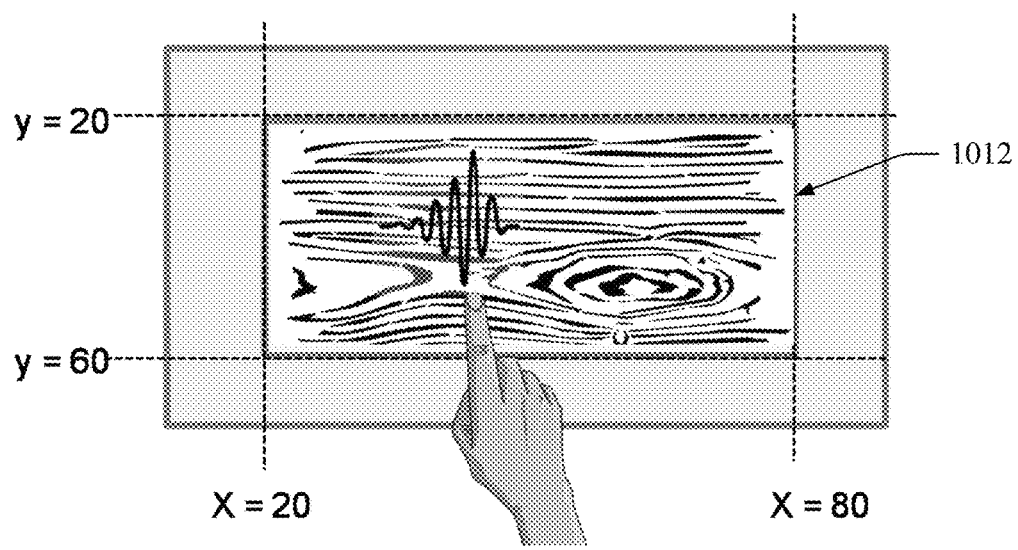

FIG. 10 illustrates a block diagram (1000) of simulated physical interfaces of respective interactive surfaces including tactile sensors (1010, 1012). An interactive surface of tactile sensor 1010 generates continuous haptic feedback simulating a structured texture (e.g., dots) in response to a finger being determined to be moving within the interactive surface. An interactive surface of tactile sensor 1012 generates continuous haptic feedback simulating a randomized texture (e.g., wood pattern) in response to the finger being determined to be moving within the interactive surface.

In another embodiment, the haptic feedback device generates a haptic feedback to facilitate identification of a boundary of the interactive surface. In this regard, in embodiment(s), the haptic feedback device simulates an edge of the boundary and/or a contour of the boundary.

Figure 11:
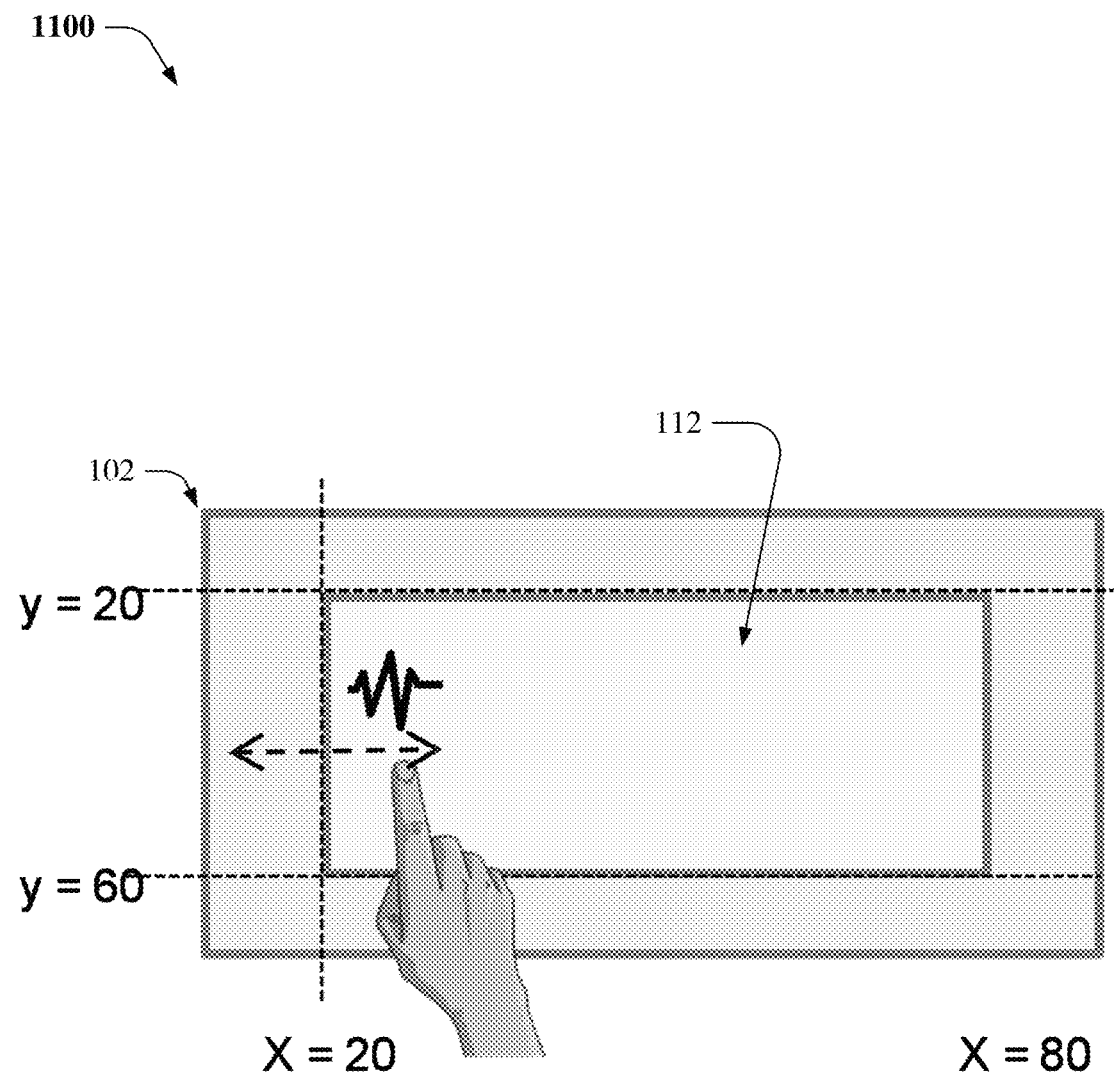
FIG. 11 illustrates a block diagram of a simulated physical interface of an interactive surface of a tactile sensor of a system, in which the interactive surface generates haptic feedback in response to a finger being determined to be moving across, e.g., entering or exiting, a boundary of the interactive surface, in accordance with various example embodiments.

For example, and now referring to FIG. 11, a block diagram (1100) of a simulated physical interface of an interactive surface (112) of a tactile sensor of a system, in which the interactive surface generates haptic feedback in response to a finger being determined to be moving across, e.g., entering or exiting, a boundary of the interactive surface is illustrated, in accordance with various example embodiments.

In embodiment(s) (not shown), the tactile sensor comprises a touchpad-based user interface and respective regions comprising respective interaction zones comprising respective haptic widgets—the respective haptic widgets representing respective simulated physical interfaces comprising the defined type of simulated physical interface.

Figure 12:
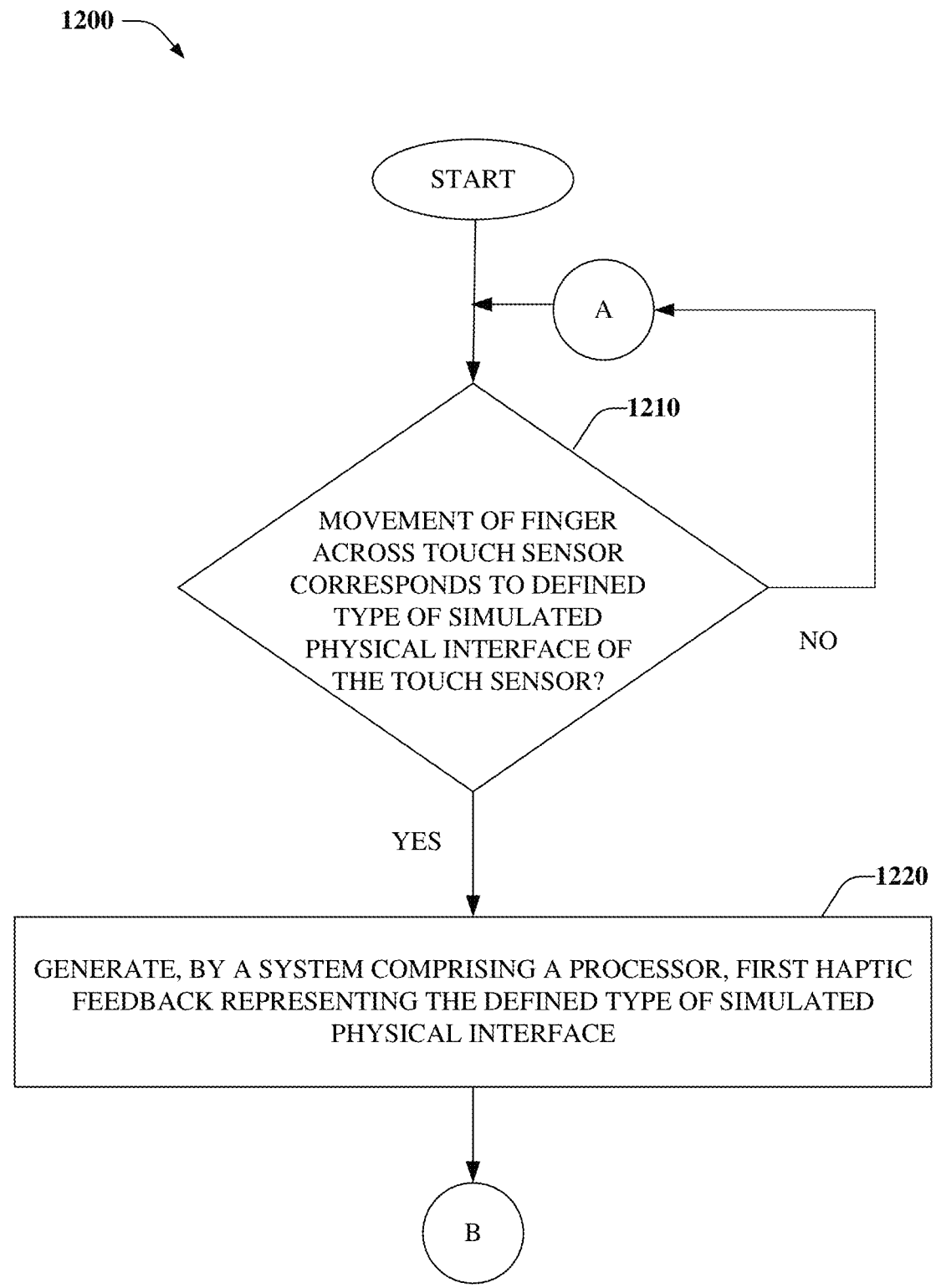
FIGS. 12-13 illustrate flowcharts of a method performed by a system that includes a tactile sensor that simulates a physical interface utilizing touch tracking, force sensing, and haptic feedback, in accordance with various example embodiments.
Figure 13:
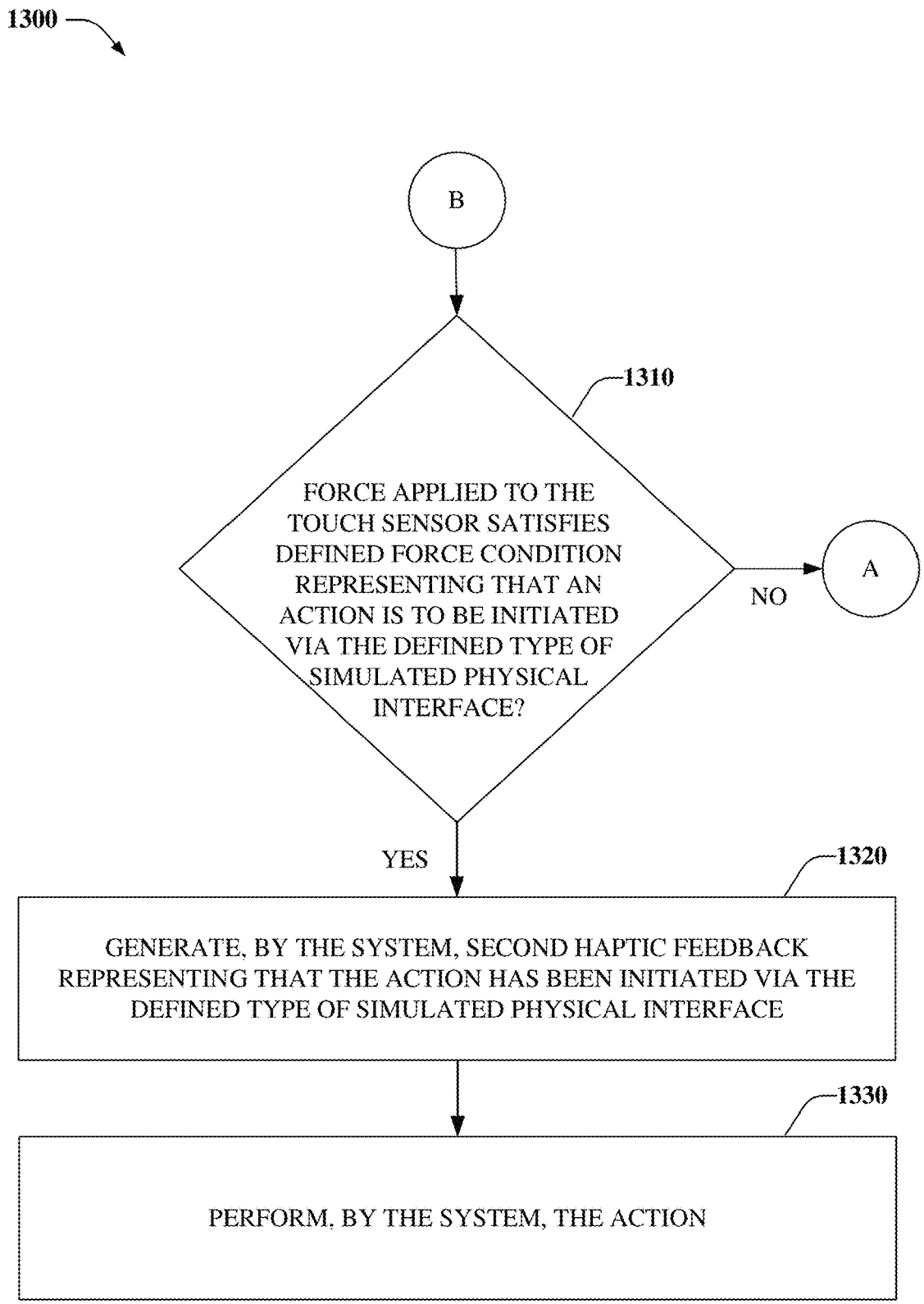

FIGS. 12-13 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media-including non-transitory machine readable media.

FIGS. 12-13 illustrate flowcharts (1200, 1300) of a method performed by a system (102) that includes a touch sensor, e.g., tactile sensor (110)—the system simulating a physical interface utilizing touch tracking, force sensing, and haptic feedback, in accordance with various example embodiments. At 1210, system determines whether movement of a finger across the touch sensor corresponds to a defined type of simulated physical interface, e.g., corresponding to a haptic widget, of the touch sensor. In response to the movement of the finger across the touch sensor being determined to correspond to the defined type of simulated physical interface, flow continues to 1220, at which the system generates first haptic feedback representing the defined type of simulated physical interface; otherwise flow returns to 1210.

Flow continues from 1220 to 1310, at which the system determines whether a force that has been applied to the touch sensor satisfies a defined force condition representing that an action is to be initiated via the defined type of simulated physical interface. In response to the force that has been applied to the touch sensor being determined to satisfy the defined force condition, flow continues to 1320, at which the system generates second haptic feedback representing that that the action has been initiated via the define type of simulated physical interface; otherwise flow returns to 1210. Flow continues from 1320 to 1330, at which the system performs the action.

As it employed in the subject specification, the terms "processor" and "processing component" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processing component can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. A processing component can exploit nano-scale architectures such as, but not limited to, molecular and quantum-dot based transistors, switches, and gates, in order to optimize space usage or enhance performance of components described herein. Further, a processing component can also be implemented as a combination of computing processing units.

In the subject specification, the terms "memory", "memory component", and substantially any other information storage component relevant to operation and functionality of a system (e.g., 102) disclosed herein refer to "memory components," or entities embodied in a "memory," or components comprising the memory. It will be appreciated that the memory can include volatile memory and/or nonvolatile memory. By way of illustration, and not limitation, volatile memory, can include random access memory (RAM), which can act as external cache memory. By way of illustration and not limitation, RAM can include synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and/or Rambus dynamic RAM (RDRAM). In other embodiment(s) nonvolatile memory can include read only memory (ROM), programmable ROM (PROM), electrically programmable ROM (EPROM), electrically erasable ROM (EEPROM), or flash memory. Additionally, the components and/or devices disclosed herein can comprise, without being limited to comprising, these and any other suitable types of memory.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

As another example, a device (e.g., touch sensing device, haptic feedback device, force sensing device) can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, the device can be an apparatus that provides specific functionality through electronic components without mechanical parts; the electronic components can include one or more processors therein to execute software and/or firmware that confer(s), at least in part, the functionality of the electronic components.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word-without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Aspects of components, logic, apparatus, devices, processes, and process blocks explained herein can be embodied within hardware, such as an ASIC or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The above description of illustrated embodiments of the subject disclosure is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used, or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
    a processor; and
    a memory that stores executable instructions that, when executed by the processor, facilitate performance of operations by the processor, comprising:
        receiving, via a user interface (UI) of the system during a first configuration step of a tactile sensor, a first input specifying a defined type of haptic pattern to be associated with a defined region of an interactive surface of the tactile sensor;
        receiving, via the UI during a second configuration step of the tactile sensor, a second input specifying a defined type of simulated physical interface to be associated with the defined type of haptic pattern;
        tracking, via a touch sensing device of the tactile sensor, respective movements of at least one finger across the tactile sensor;
        in response to a location of the respective movements being determined, based on the first configuration step and the second configuration step, to correspond to the defined region of the interactive surface of the tactile sensor representing the defined type of simulated physical interface, generating, via a haptic feedback device of the tactile sensor that is physically coupled to the interactive surface, a first haptic feedback at the location, wherein the first haptic feedback comprises the defined type of haptic pattern that has been associated with the defined type of simulated physical interface;
        based on the defined type of simulated physical interface, detecting, via a force sensing device of the tactile sensor, whether an amount of force that has been applied to the interactive surface satisfies a defined force condition representing that the interactive surface has been pressed down within a predefined force range, wherein the defined force condition represents that an action is to be initiated, via the defined type of simulated physical interface, by the system; and
        in response to the amount of force being determined to satisfy the defined force condition representing that the action is to be initiated, generating, via the haptic feedback device, a second haptic feedback via the interactive surface, wherein the second haptic feedback represents a second indication that the action has been initiated by the system.

2. The system of claim 1, wherein the defined type of simulated physical interface comprises a simulated push-button interface.

3. The system of claim 2, wherein the first haptic feedback simulates a structured texture representing an array of physical dots representing the simulated push-button interface, and wherein the first haptic feedback is continuously generated in response to a finger of the at least one finger being determined to be moving within the interactive surface.

4. The system of claim 2, wherein the second haptic feedback represents that the simulated push-button interface has been switched on or off.

5. The system of claim 2, wherein the action is a first action, and wherein the operations further comprise:
in response to detecting, via the force sensing device, that two fingers have been pressed down onto the simulated push-button interface, initiating a second action that is different from the first action.

6. The system of claim 1, wherein the defined type of simulated physical interface comprises a simulated slider interface.

7. The system of claim 6, wherein the first haptic feedback simulates a randomized texture representing a wooden pattern representing the simulated slider interface, and wherein the first haptic feedback is continuously generated in response to a finger of the at least one finger being determined to be moving within the interactive surface.

8. The system of claim 6, wherein the second haptic feedback represents that the simulated slider interface has been activated, and wherein the operations further comprise:
in response to the force being determined to satisfy the defined force condition, and further in response to a movement of the respective movements being determined to satisfy a defined movement condition representing that a finger of the at least one finger has moved across the tactile sensor in a defined direction for a defined distance, generating, via the haptic feedback device, a third haptic feedback via the interactive surface, wherein the third haptic feedback represents that the simulated slider interface has moved across the tactile sensor in the defined direction for the defined distance, and wherein the defined movement condition corresponds to an incremental modification of a variable corresponding to a device of the system.

9. The system of claim 6, wherein the action is a first action, and wherein the operations further comprise:
in response to detecting, via the force sensing device, that two fingers have been pressed down onto the simulated slider interface, initiating a second action that is different from the first action.

10. The system of claim 1, wherein the first haptic feedback comprises a haptic waveform, and wherein the operations further comprise:
determining a speed of a movement of the respective movements; and
based on the speed of the movement, modifying at least one of a type of the haptic waveform, an amplitude of the haptic waveform, or a frequency of the haptic waveform.

11. The system of claim 1, wherein the first haptic feedback comprises a haptic waveform, wherein the force is a first applied force, and wherein the operations further comprise:
determining, via the force sensing device, a second applied force corresponding to a movement of the respective movements; and
based on the second applied force, modifying at least one of a type of the haptic waveform, an amplitude of the haptic waveform, or a frequency of the haptic waveform.

12. The system of claim 1, wherein the location is a first location, and wherein the operations further comprise:
generating a third haptic feedback to facilitate identification of a second location of the interactive surface, wherein the third haptic feedback represents a third indication of a boundary of the interactive surface and simulates at least one of an edge of the boundary or a contour of the boundary.

13. The system of claim 1, wherein the system comprises a touchpad-based user interface comprising the tactile sensor and respective regions comprising respective interaction zones comprising respective haptic widgets, and wherein the respective haptic widgets represent respective simulated physical interfaces comprising the defined type of simulated physical interface.

14. A method, comprising:
receiving, by a system comprising at least one processor via an interface of the system during a configuration of a touch sensor of the system, a first group of inputs representing respective defined types of haptic patterns to be associated with an interactive surface of the touch sensor;
receiving, by the system via the interface during the configuration of the touch sensor, a second group of inputs representing respective defined types of simulated physical interfaces of the touch sensor to be associated with the respective defined types of haptic patterns;
in response to a movement of a finger across the touch sensor being determined, based on the configuration of the touch sensor, to correspond to a first defined type of simulated physical interface of the respective defined types of simulated physical interfaces of the touch sensor, generating, by the system, first haptic feedback comprising a second defined type of haptic pattern of the respective defined types of haptic patterns that has been associated with the first defined type of simulated physical interface;
in response to detecting a force that has been applied to the touch sensor, determining, by the system, whether the force satisfies a defined force condition representing that the finger has been pressed onto the touch sensor within a predefined force range representing that an action is to be initiated via the defined type of simulated physical interface; and
in response to the force being determined to satisfy the defined force condition,
generating, by the system, a second haptic feedback representing that the action has been initiated via the defined type of simulated physical interface, and
performing, by the system, the action.

15. The method of claim 14, wherein the generating of the second haptic feedback comprises:
in response to the movement of the finger being determined to correspond to a haptic widget representing a virtual push-down button, and in response to the force being determined to satisfy a defined force condition representing that the virtual push-down button has been pushed, generating the second haptic feedback representing that the virtual push-down button has been pushed.

16. The method of claim 14, wherein the movement is a first movement, and wherein the generating of the second haptic feedback comprises:
in response to the first movement of the finger being determined to correspond to a haptic widget representing a virtual slider control, and further in response to the force being determined to satisfy the defined force condition representing that the virtual slider control has been contacted, and further in response to a movement of the finger being determined to satisfy a defined movement condition representing that the finger has moved across the touch sensor in a defined direction for a defined distance, generating a third haptic feedback representing that the virtual slider control has moved in the defined direction for the defined distance, wherein the defined movement condition corresponds to an incremental modification of a variable corresponding to a device of the system.

17. The method of claim 14, further comprising:
generating, by the system, a third haptic feedback that represents a boundary of the touch sensor by simulating at least one of an edge of the boundary or a contour of the boundary.

18. The method of claim 14, further comprising:
determining, by the system, a speed of the movement or an applied force corresponding to the movement; and
based on the speed of the movement or the applied force corresponding to the movement, modifying, by the system, at least one of a type of a haptic waveform of the first haptic feedback, an amplitude of the haptic waveform, or a frequency of the haptic waveform.

19. A non-transitory machine-readable medium, comprising executable instructions that, when executed by a system comprising a processor, facilitate performance of operations, comprising:
in response to a first input of a configuration of a tactile sensor specifying a defined type of haptic pattern to be associated with a defined region of a surface of the tactile sensor being received via a user interface (UI) of the system, receiving, via the UI, a second input of the configuration of the tactile sensor specifying a defined type of simulated physical interface to be associated with the defined type of haptic pattern;
in response to a location of the surface of the tactile sensor being determined, based on the configuration of the tactile sensor, to have been contacted, determining whether the location corresponds to the defined type of simulated physical interface that has been associated with the defined type of haptic pattern;
in response to the location being determined to correspond to the defined type of simulated physical interface, generating, via the surface, first haptic feedback comprising the defined type of haptic pattern; and
in response to a force that has been applied to the surface of the tactile sensor being determined to satisfy a defined force condition representing the interactive surface has been pressed within a predefined force range representing that an action is to be initiated,
generating, via the surface, a second haptic feedback representing that the action has been initiated via the defined type of simulated physical interface, and
performing the action.

20. The non-transitory machine-readable medium of claim 19, wherein the generating of the first haptic feedback comprises:
simulating a structured texture representing an array of physical dots representing a simulated push-button interface or a simulated toggle-switch interface, or
simulating a randomized texture representing a wooden pattern representing a simulated slider interface, wherein the first haptic feedback is continuously generated in response to a finger being determined to be moving within the simulated push-button interface, the simulated toggle-switch interface, or the simulated slider interface.

* * * * *